US007076490B2

(12) United States Patent
Park et al.

(10) Patent No.: US 7,076,490 B2
(45) Date of Patent: Jul. 11, 2006

(54) OBJECT-RELATIONAL DATABASE MANAGEMENT SYSTEM AND METHOD FOR DELETING CLASS INSTANCE FOR THE SAME

(75) Inventors: Yoo-Mi Park, Daejon (KR); Byung-Sun Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 496 days.

(21) Appl. No.: 10/269,567

(22) Filed: Oct. 11, 2002

(65) Prior Publication Data

US 2003/0074371 A1    Apr. 17, 2003

(30) Foreign Application Priority Data

Oct. 13, 2001    (KR) ................... 2001-63209

(51) Int. Cl.
*G06F 17/30*    (2006.01)

(52) U.S. Cl. .............. 707/100; 707/101; 707/102; 707/103 R; 707/104.1

(58) Field of Classification Search ........ 707/100, 707/101, 102, 103 R, 104.1, 3, 10, 205
See application file for complete search history.

(56) References Cited

U.S. PATENT DOCUMENTS

| 4,480,304 | A | * | 10/1984 | Carr et al. | 710/200 |
| 4,589,092 | A | * | 5/1986 | Matick | 711/207 |
| 5,043,876 | A | * | 8/1991 | Terry | 707/201 |
| 5,291,583 | A | * | 3/1994 | Bapat | 717/137 |
| 5,295,256 | A | * | 3/1994 | Bapat | 717/137 |
| 5,499,371 | A | * | 3/1996 | Henninger et al. | 717/108 |
| 5,551,029 | A | * | 8/1996 | Jagadish et al. | 707/103 R |
| 6,108,664 | A | | 8/2000 | Nori et al. | |
| 6,134,558 | A | | 10/2000 | Hong et al. | |
| 6,141,658 | A | * | 10/2000 | Mehr et al. | 707/7 |
| 6,268,850 | B1 | * | 7/2001 | Ng | 715/866 |
| 6,438,547 | B1 | * | 8/2002 | Mehr et al. | 707/7 |
| 6,453,356 | B1 | * | 9/2002 | Sheard et al. | 709/231 |
| 6,490,581 | B1 | * | 12/2002 | Neshatfar et al. | 707/4 |
| 6,938,260 | B1 | * | 8/2005 | Wason | 719/316 |
| 6,985,912 | B1 | * | 1/2006 | Mullins et al. | 707/103 R |

FOREIGN PATENT DOCUMENTS

| EP | 0472812 A1 | * | 2/1991 |
| KR | 10-0315601 | | 1/2002 |
| KR | 10-0333682 | | 4/2002 |
| WO | WO 9503586 | * | 2/1995 |
| WO | WO 9504960 | * | 2/1995 |
| WO | WO 9703406 | * | 1/1997 |

OTHER PUBLICATIONS

Liu, Chengfei et al., "Realizing Object-Relational Databases by Mixing Tables with Objects", pp. 335-346.

* cited by examiner

*Primary Examiner*—Frantz Coby
(74) *Attorney, Agent, or Firm*—Blakely, Sokoloff, Taylor & Zafman

(57) ABSTRACT

Provided are a main-memory resident object-relational database management system (ORDBMS) and a method of deleting a class instance using the ORDBMS. The method includes obtaining a mutual exclusive lock for a class to be deleted as per the query and a child class inheriting from the class when a query of deleting an instance is input from a database access application program, and deleting the instance from the class and at least one instance related to the instance from its child class using OID reference.

10 Claims, 16 Drawing Sheets

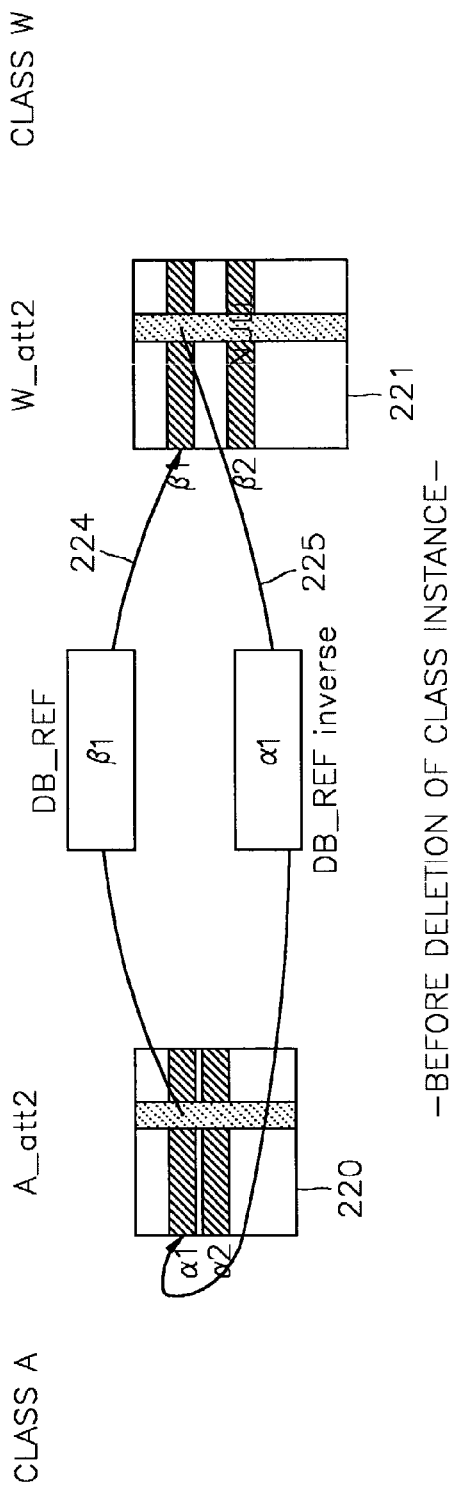

—BEFORE DELETION OF CLASS INSTANCE—

-AFTER DELETION OF CLASS INSTANCE-

OBJECT-RELATIONAL DATABASE MANAGEMENT SYSTEM AND METHOD FOR DELETING CLASS INSTANCE FOR THE SAME

BACKGROUND OF THE INVENTION

This application claims the priority of Korean Patent Application No. 2001-63209, filed Oct. 13, 2002 in the Korean Intellectual Property Office, which is incorporated herein in its entirety by reference.

Field of the Invention

The present invention relates to a database management system (DBMS), and more particularly, to a method for deleting instances of classes that have a vertical relationship (inheritance relationship) or a horizontal relationship (1:1, 1:N, or M:N relationship) that are stored as object identifier (OID) sets in a main-memory resident object-relational database management system (ORDBMS).

Description of the Related Art

A database management system (DBMS) is a system software that is capable of maintaining the consistency of large amounts of information and searching data effectively. With the exponential growth of Internet traffic, information service provider have faced finding solutions for the very-high-speed information services on the Internet. There has been also a growing need for the processing of various types of information and quick access to desired data using the Internet. This growing need requires changes in the structure and paradigm of the conventional DBMS which is a foundation of an information system. One of the changes is the rise in the prevalence of a main-memory resident DBMS in which hole database resides in a main memory device. Main memory-resident database management solutions have gained widespread acceptance in the marketplace after years of research and development in both academic and commercial settings. These technologies offer dramatic performance boosts over disk-based RDBMS systems, even when those systems are running with all of their data buffered in main memory.

The main-memory resident DBMS can be also used as a front-end of conventional disk-based DBMSs to increase the performance of a system. At present, the main-memory resident DBMS is widely used as a front-end DBMS of a disk-based DBMS or a built-in DBMS around the world.

A main-memory resident object-relational (OR) DBMS having the characteristics of the existing main-memory resident DBMS and being capable of processing data at a high speed has recently been developed. The ORDBMS can flexibly process data through object-oriented queries.

Also each object includes an object identifiers (OIDs) and, thus, can represent horizontal and vertical relationships between classes of an object-relational database. The ORDBMS supports relationships of 1:1, 1:N, or M:N types between classes to model the horizontal relationship between classes. When expressing the relationship between classes, an OID acts as a pointer to a related object, thereby increasing an efficiency ratio of query processing. That is, when there is a request for two or more classes to be joined, the use of OIDs makes it possible to obtain a desired result by directly joining the classes without a burden of an additional memory and cost for join operation.

As previously mentioned, the main-memory resident ORDBMS stores the vertical and horizontal relationships among classes as OID sets. For this reason, if OID pointers related to a class instance are not correctly and completely deleted when deleting the class instances, OID pointers indicating the deleted class instance remain in a certain class, and it becomes a dangling pointer. This would deteriorate the consistency within database. Accordingly, it is required to completely delete class instances and their OID pointers to another classes.

SUMMARY OF THE INVENTION

To solve the above problem, it is an object of the present invention to provide a method for deleting a class instance without deteriorating the consistency within database, through which a target class(that is a class in a delete request) instance and object-identifier (OID) pointers of the target class and their related pointer to another classes are completely and correctly deleted according to a request for deletion of the class instance from user clients.

To achieve one aspect of the above object, there is provided a method of deleting a class instance using an object-relational database management system (ORDBMS), the method including (a) obtaining a mutual exclusive lock for a class to be deleted and its related classes and a child class inheriting from the class when a query of deleting an instance is input from a database access application program, and (b) deleting the instance to be satisfied with the query condition from the class and its all child classes. Obtaining a mutual exclusive lock for classes to be deleted, which is mentioned in (a), includes (a-1) requesting the mutual exclusive lock for the class to be deleted, and (a-2) obtaining the mutual exclusive lock for its child class while searching for its child classes when the mutual exclusive lock for the class to be deleted is obtained.

Deleting instances described in (b) includes (b-1) checking the type of attribute of the class to be deleted; (b-2) deleting a reverse pointer(that is, represented as the instance OID) indicating the instance to be deleted if it is determined in (b-1) that the type of attribute is 1:1; (b-3) deleting the reverse pointer(that is, represented as the instance OID) indicating the instance to be deleted if it is determined in (b-1) that the type of attribute is 1:N; and (b-4) deleting the instance of the class to be deleted after (b-2) and (b-3) are successfully performed.

To achieve another aspect of the above object, there is provided an ORDBMS including a database in which a relationship between classes is stored with OID pointer sets.

BRIEF DESCRIPTION OF THE DRAWINGS

The above object and advantages of the present invention will become more apparent by describing in detail preferred embodiments thereof with reference to the attached drawings in which:

FIGS. 4A and 4B are diagrams illustrating the change in the relationship between the classes having 1:1 type horizontal relationship shown in FIG. 3 from before the deletion of a class instance to after the deletion of a class instance;

DETAILED DESCRIPTION OF THE INVENTION

Figure 1:
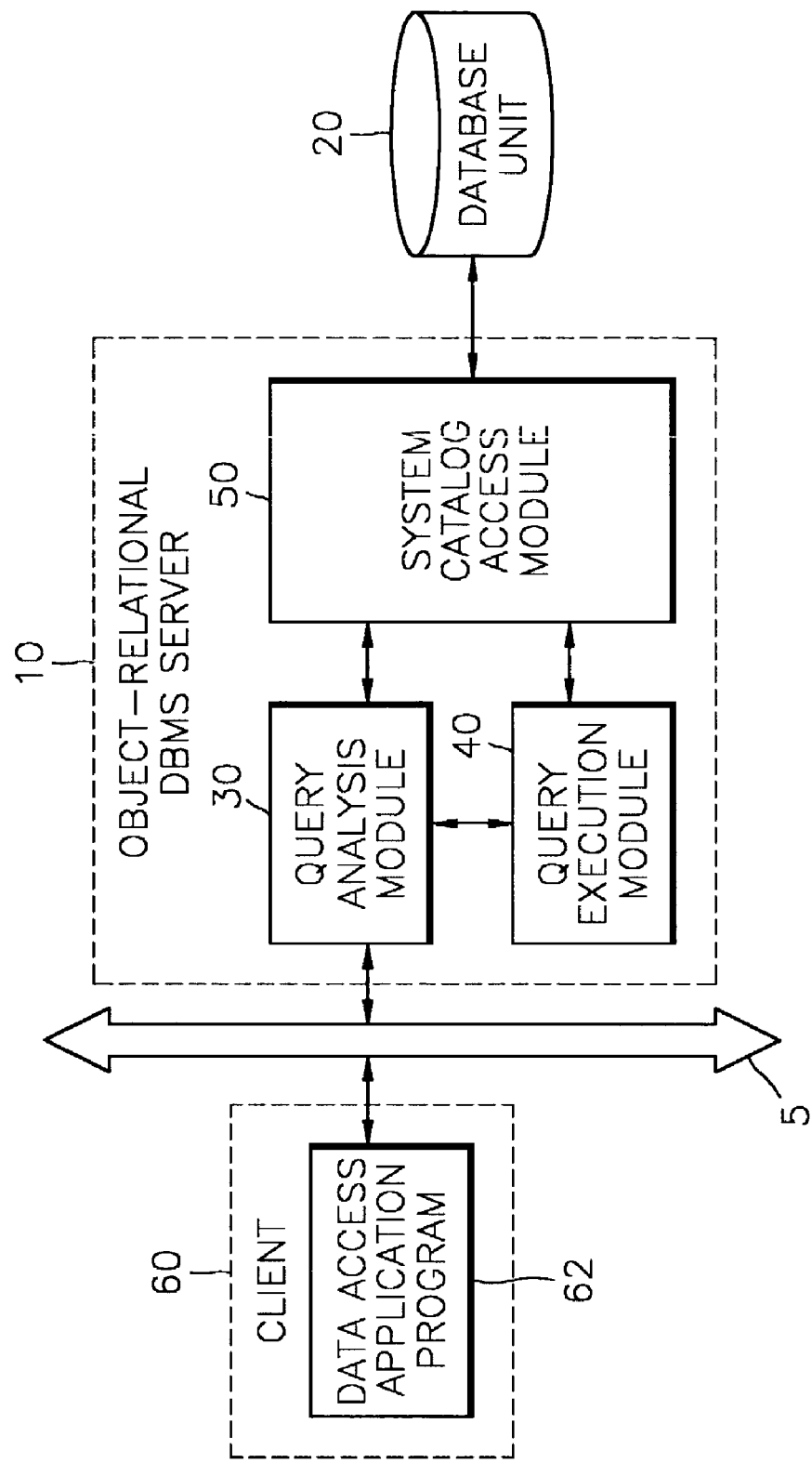
FIG. 1 is a block diagram of an object-relational database management system (ORDBMS) that resides in a main memory device.

FIG. 1 is a block diagram of a main-memory resident object-relational database management system (ORDBMS) according to a preferred implementation of the present invention. The ORDBMS of FIG. 1 includes a main-memory resident ORDBMS server 10 and a client 60 connected to the ORDBMS server 10 through the network. The ORDBMS server 10 manages the main-memory resident database unit 20 and includes a query analysis module 30, a query execution module 40, and a system catalog access module 50. The client 60 includes a database access application program 62.

The query analysis module 30 receives a request for access to the main-memory resident database unit 20 from the database access application program 62 of the client 60 and analyzes the request. According to the analyzed query, the query execution module 40 refers to a system catalog (not shown) using the system catalog access module 50 and searches for manipulating databases.

Figure 2:
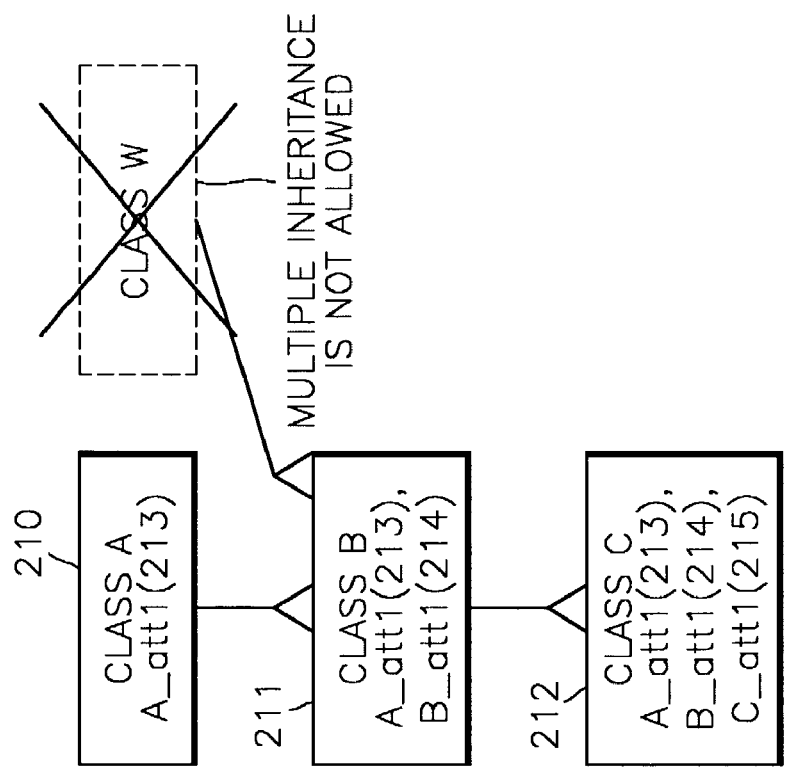
FIG. 2 is a diagram illustrating an example of a vertical relationship between classes defined by a data access application program.

FIG. 2 is a diagram illustrating an example of vertical relationship, i.e., inheritance relationship, between classes defined in the data access application program 62. Referring to FIG. 2, the ORDBMS according to the present invention defines that one class shall inherit from only one class. In other words, a class is given the names and types of attributes that are defined in an upper class and uses the given names and types without changing them, and has the possibility of taking on inherent attributes of the upper class. More specifically, multiple-inheritance is not allowed, i.e., one class cannot inherit from several upper classes.

Referring to FIG. 2, a class B 211 inherits from a class A 210 and the class C 212 inherits from the class B 211. Consequently, the class B 211 includes an attribute A_att1 213 given from the class A 210 and an attribute B_att1 214 that is defined in the class B 211. The class C 212 includes the attribute A_att1 213 given from the class A 210, the attribute B_att1 214 given from the class B 211, and an attribute C_att1 215 that is defined in the class C 212.

Therefore, a deletion query of deleting the class A 210, which is the uppermost class, is applied to both the class B 211 and the class C 213.

Hereinafter, the horizontal relationship between classes defined in an OR database according to the present invention will be described with reference to FIGS. 3, 4A, 4B, 5, 6A, 6B, 7, 8A, and 8B. In the OR database, there are three cases of a horizontal relationship between classes: one-to-one (1:1) relationship, one-to-N (1:N) relationship, and M-to-N (M:N) relationship.

Figure 3:
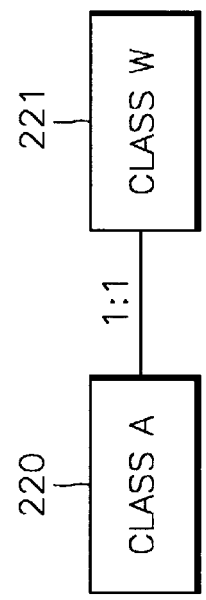
FIG. 3 is a diagram illustrating an example of a 1:1 type horizontal relationship between classes defined in the data access application program.

FIG. 3 is a diagram illustrating an example of a horizontal relationship (1:1 relationship) between classes defined in the data access application program. FIGS. 4A and 4B are diagrams illustrating the change in the relationship between the classes having the horizontal relationship shown in FIG. 3 from before the deletion of a class instance to after the deletion of the class instance.

Referring to FIGS. 3 and 4A, a class A 220 and a class W 221 have a horizontal relationship (1:1 relationship). More specifically, the class A 220 accesses a certain instance $\beta1$ of the class W 221 through an attribute A_att2 222, and the class W 221 accesses an instance $\alpha1$ of the class A 220, which refers to the instance $\beta1$, through an attribute W_att2 223. That is, the attribute A_att2 222 of the class A 220 includes an instance object-identifier (OID) 224 of the class W 221 and can indicate the instance $\beta1$ of the class W 221. Also, the attribute W_att2 223 of the class W 221 includes an instance OID 225 indicating its instance $\beta1$ and thus can indicate the instance $\alpha1$ of the class A 220, which refers to the instance $\beta1$.

To delete the instance $\alpha1$ of the class A 220, the following query made of structural query language (SQL) is used:

exec sql delete A where . . . ;

As for the above query, if the instance $\alpha1$ satisfies the conditions written in the 'where' clause, the attribute W_att2 223 of the instance $\beta1$ of the class W 221 related to the instance $\alpha1$ and the instance $\alpha1$ of the class A 220 are sequentially deleted, as shown in FIG. 4B. In this case, the attribute W_att2 223 of the instance $\beta1$ of the related class W 221 is also deleted. Therefore, after the instance $\alpha1$ is deleted, it cannot be referred to by the class W 221. As a result, consistency within database can be maintained.

Figure 5:
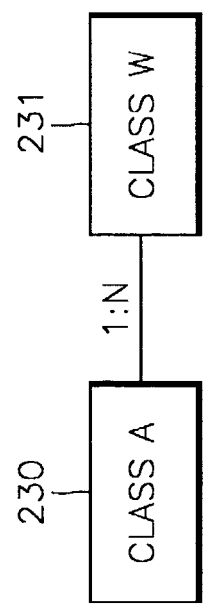
FIG. 5 is a diagram illustrating an example of a 1:N type horizontal relationship between classes defined by the data access application program.
Figure 6A:
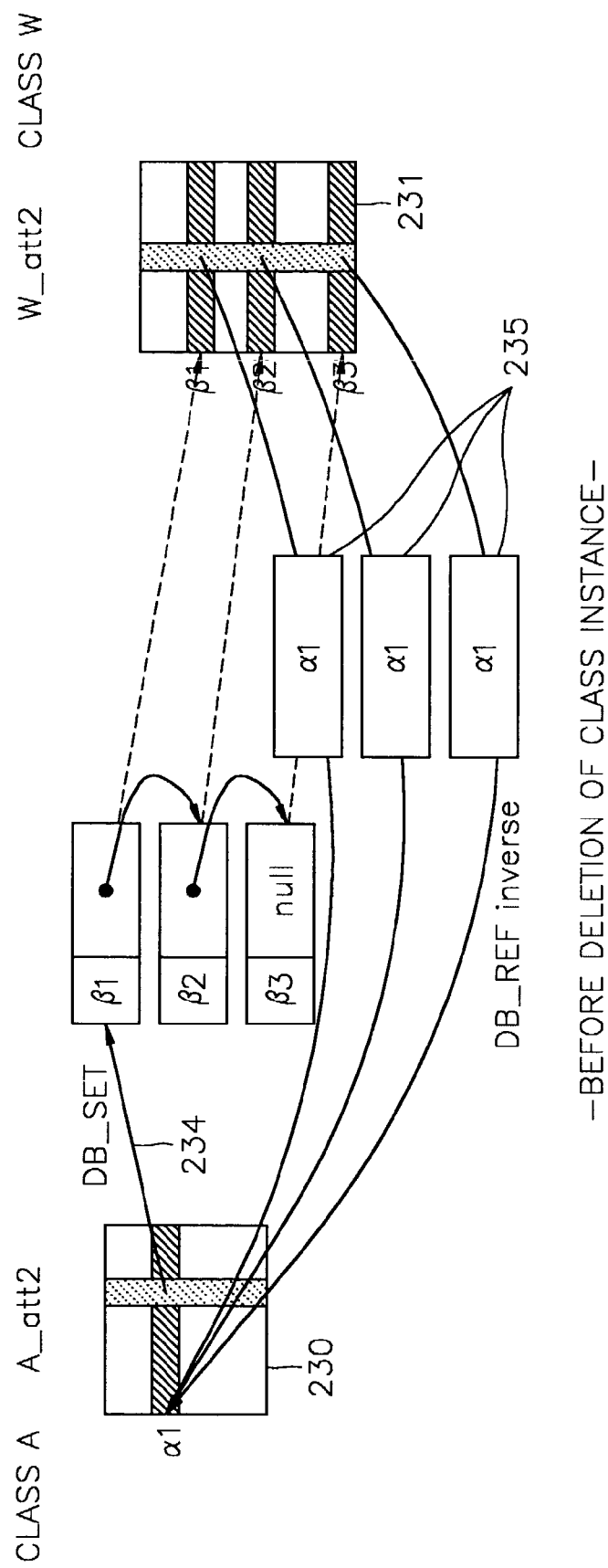
FIGS. 6A and 6B are diagrams illustrating the change in the relationship between the classes having the 1:N type horizontal relationship shown in FIG. 5 from before the deletion of a class instance (FIG. 6A) to after (FIG. 6B)
Figure 6B:
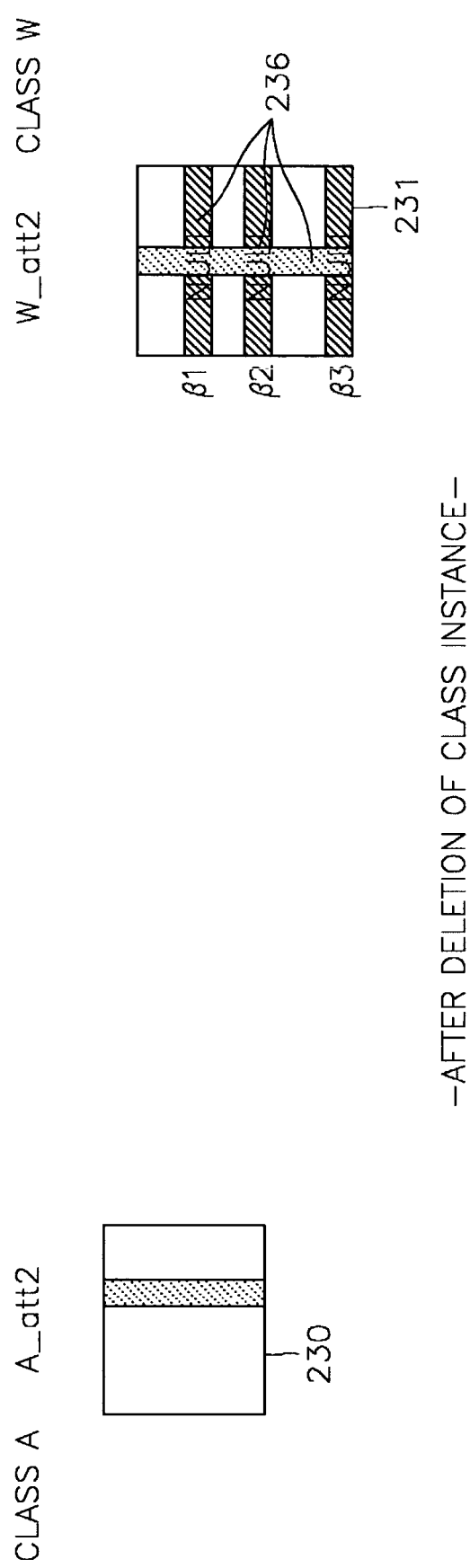

FIG. 5 is a diagram illustrating an example of a horizontal relationship (1:N relationship) between a class A 230 and a class W 231 defined by the data access application program 62. FIGS. 6A and 6B are diagrams illustrating a change in the relationship between the class A 230 and the class W 231 having the horizontal relationship, as shown in FIG. 5, from before the deletion of a class interface (FIG. 4A) to after (FIG. 4B).

Referring to FIGS. 5 and 6A, a class A 230 and a class W 231 have a horizontal relationship (1:N relationship). The class A 230 accesses several instances, i.e., N instances, of the class W 231 through an attribute A_att2 232, and the class W 231 accesses an instance $\alpha1$, which refers to the N instances of the class W 231, through an attribute W_att2 233. That is, the attribute A_att2 232 of the class A 230 includes OID sets 234 of the N instances of the class W 231 and indicates the N instances, and the attribute W_att2 233 of the class W 231 includes an OID 235 of the instance $\alpha1$ of the class A 230, which refers to the N instances of the class W 231.

To delete the instance α1 of the class A 230, an object-relational DBMS according to the present invention requires a query made of the following SQL:

exec sql delete A where . . . ;

As for the above query, if the instance α1 satisfies the conditions expressed in the 'where' clause, the instances α1 236 of the class A 230 are deleted from attributes W_att2 233 of all of instances β1, β2, and β3, and then, the instance α1 of the class A 230 is deleted, as shown in FIG. 6B.

In this method, the object-relational DBMS according to the present invention also deletes the attributes W_att2 233 of the instances β1, β2, and β3 of the related class W 231 before deleting the instance α1 of the class A 230. Therefore, it is possible to prevent the class W 231 from referring to the deleted instance α1 after the deletion of the instance α1, thereby maintaining consistency within a database.

Figure 7:
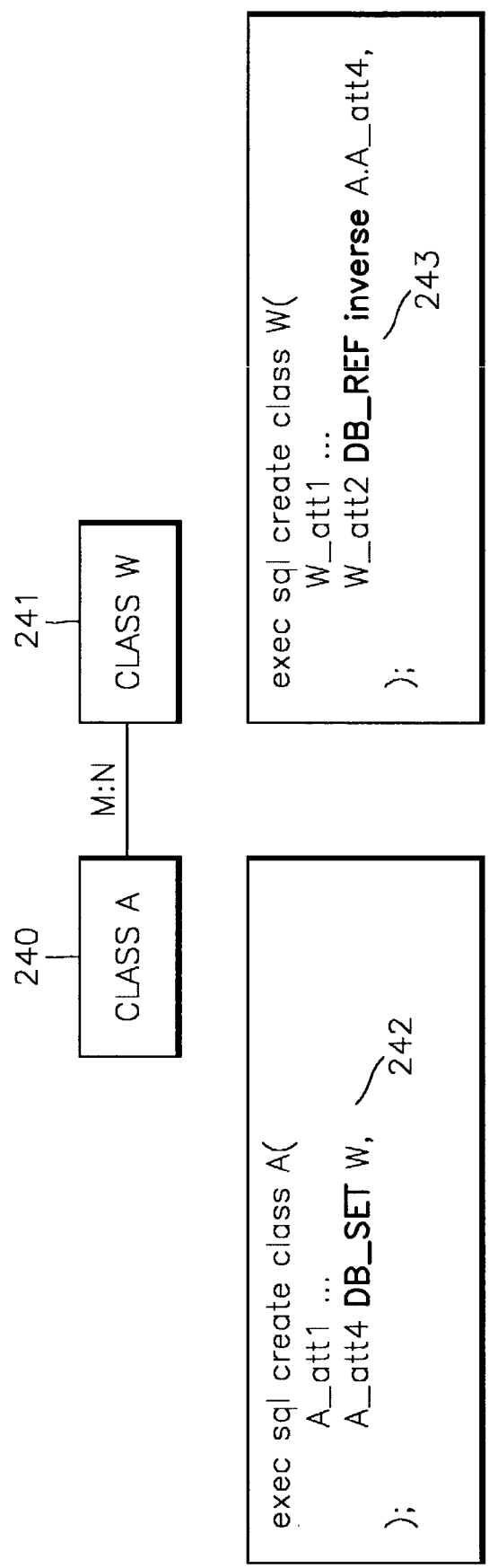
FIG. 7 is a diagram illustrating an example of a M:N type horizontal relationship between classes defined by the data access application program.
Figure 8A:
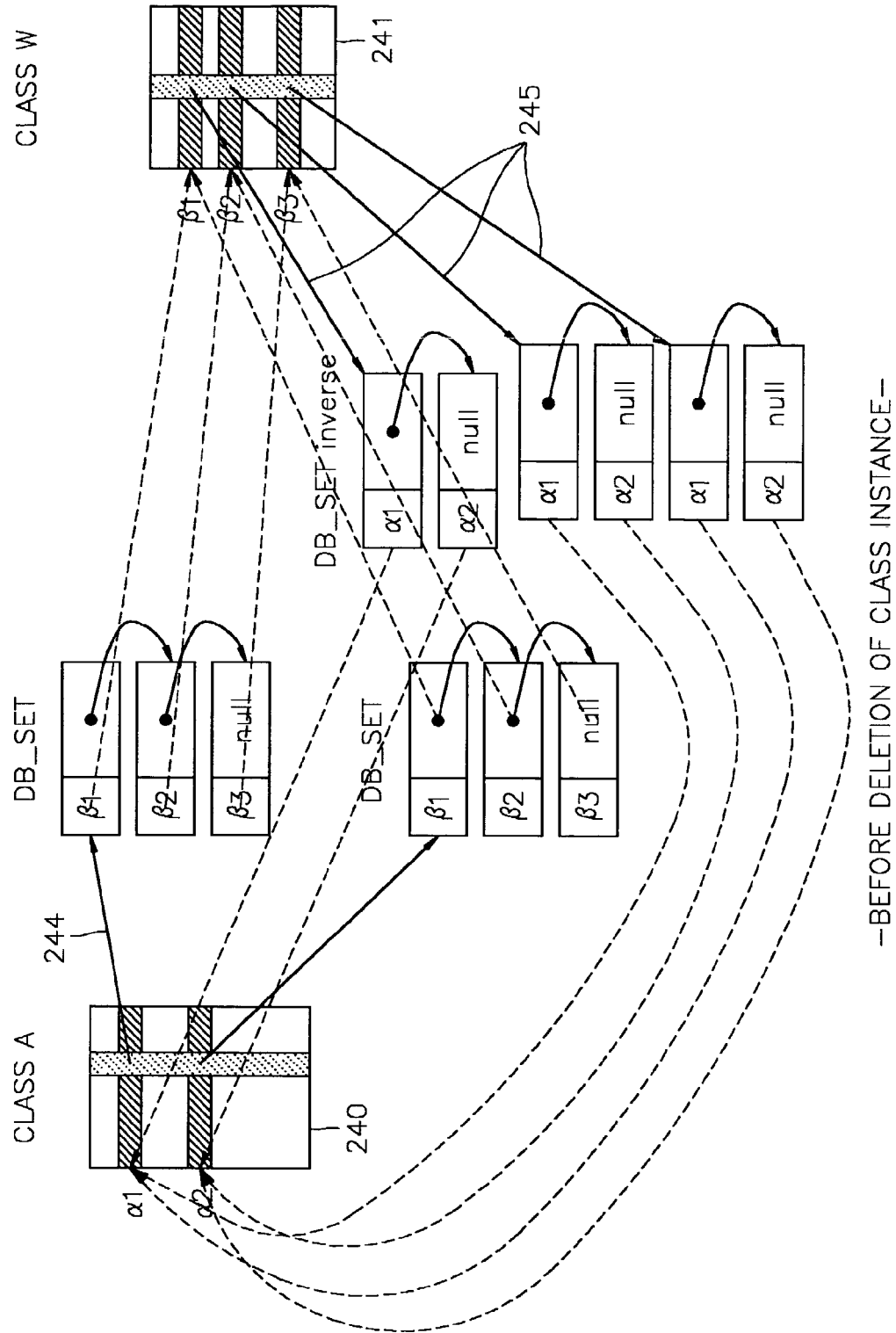
FIGS. 8A and 8B are diagrams illustrating the change in the relationship between the classes having the M:N type horizontal relationship shown in FIG. 7, before(FIG. 8A) and after deletion of a class instance (FIG. 8B)
Figure 8B:
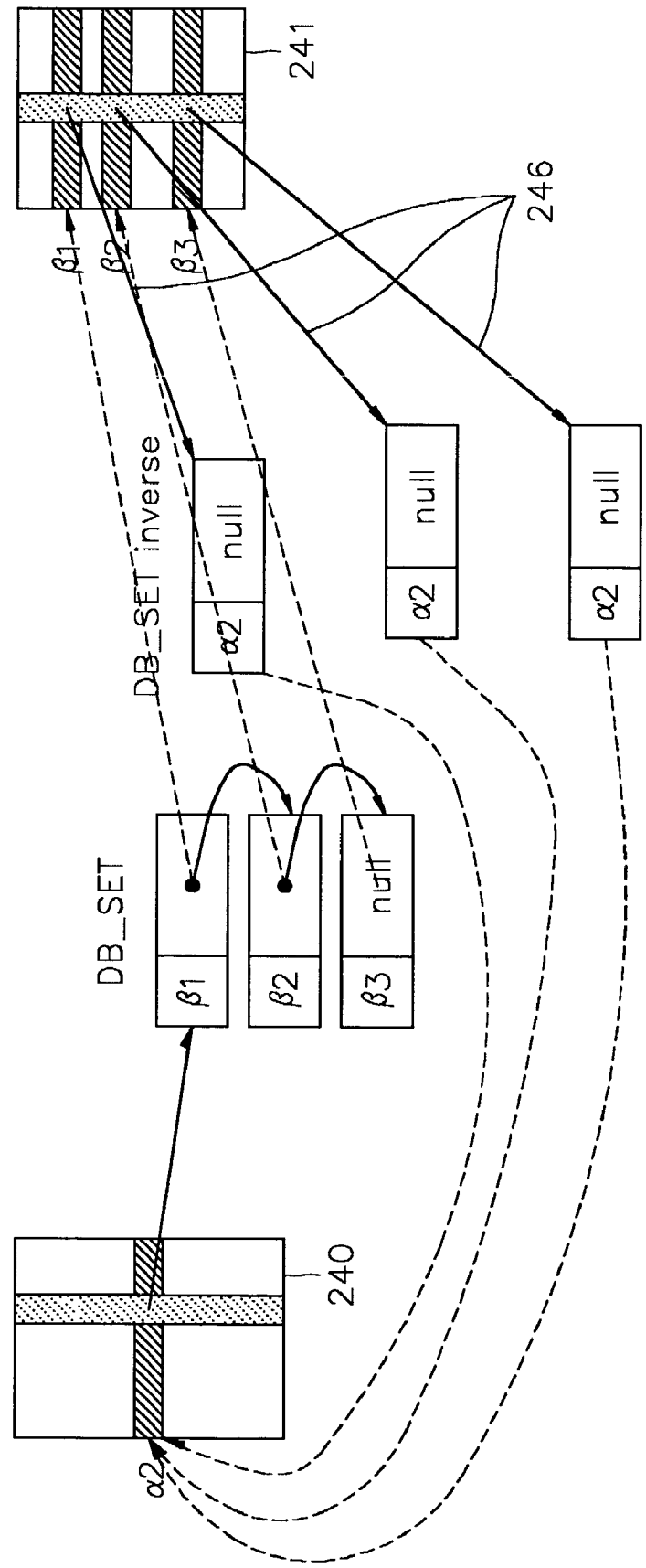

FIG. 7 is a diagram illustrating an example of a horizontal relationship (M:N relationship) between classes 240 and 241 defined by the data access application program 62. FIGS. 8A and 8B are diagrams illustrating a change in the relationship between the classes having the horizontal relationship shown in FIG. 7 from before the deletion of a class instance (FIG. 8A) to after (FIG. 8B).

Referring to FIGS. 7, 8A, and 8B, the class A 240 and the class W 241 have a horizontal relationship of an M:N relationship. A class A 240 accesses several instances, i.e., N instances, of the class W 241 through an attribute A_att2 242, and the class W 241 accesses several instances, i.e., M instances, of the class A 240, which refer to the N instances of the class W 241, through an attribute W_att2 243. That is, the attribute A_att2 242 of the class A 240 includes an OID set 244 of several instances β1, β2, and β3 of the class W 241 and can indicate instances β1, β2, and β3. The attribute W_att2 243 includes an OID set 245 of several instances α1 and α2 of the class A 240, which indicate the instances β1, β2, and β3 of the class W 241, and can indicate the instances α1 and α2.

In the ORDBMS according to the present invention, deletion of the class A 240 requires the following SQL:

exec sql delete A where . . . ;

To delete the instance al satisfying conditions defined in the 'where' clause, instances 245 of FIG. 8A related to the class A 240 are deleted from all the instances β1, β2, and β3 in the class W 241, and then, the instance al is deleted, as shown in FIG. 8B.

Therefore, the ORDBMS according to the present invention deletes the attributes W_att2 243 of the instances β1, β2, and β3 of the class W 241 before deleting the instances α1 of the class A 240. This prevents the class W 241 from referring to the instance α1 that has already been deleted, thereby maintaining consistency within a database.

Figure 9:
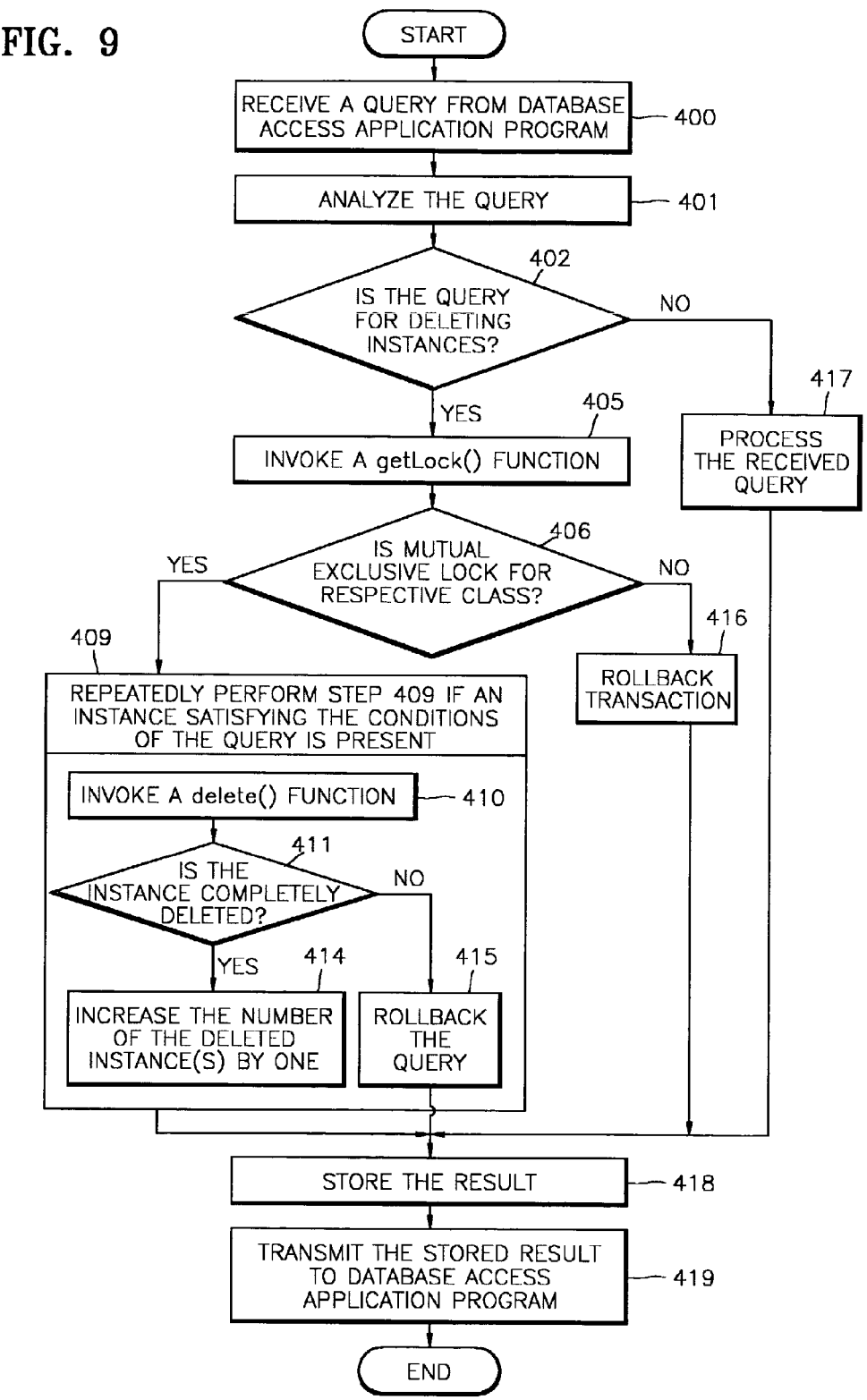
FIG. 9 is a flowchart illustrating a method for deleting a class instance in an object-relational database management system according to a preferred implementation of the present invention.

FIG. 9 is a flowchart illustrating a method for deleting a class instance in an ORDBMS according to a preferred implementation of the present invention. Referring to FIG. 9, a DBMS server according to the present invention receives a query from the database access application program 62 of FIG. 1 in step 400 and analyzes the received query in step 401. Next, the DBMS server determines whether the received query is to delete instances based on the analysis result, in step 402.

If it is determined in step 402 that the received query is to delete instances, a getLock( ) function requiring a mutual exclusive lock for the respective class is invoked in step 405. Next, it is checked whether the mutual exclusive lock has been attained for the respective class in step 406. If the mutual exclusive lock is attained, a search for instances satisfying the query conditions is performed in the class and its child class(es) inheriting from the class.

If an instance or instances is/are present, step 409 is performed repeatedly. First, it proceeds to step 410 and a delete( ) function is invoked using an instance OID that satisfies the query conditions. Next, it is checked whether the invocation of the delete( ) function resulted in the complete deletion of the instance(s) in step 411. If it is determined in step 411 that the instance(s) is(are) completely deleted, the number of the deleted instance(s) is increased by one in step 414. After step 409, the deletion result is stored in step 418 and the stored result is returned to the database access application program 62. However, if the deletion of the instance(s) is not satisfactory, operation of the query of deleting instance(s) is canceled and step 409 is not performed any further.

If it is determined in step 406 that it fails to obtain a mutual exclusive lock must been acquired with the getLock( ) function, the transaction including the query is rollbacked in step 405, the transaction is canceled in step 416. Next, the cancellation result is stored in step 418 and returned to the database access application program 419.

If it is determined in step 402 that the received query is not related to the deletion of instances, it processes the received query in step 417 and then the processing result is stored in step 418. The stored result in this instance is also returned to the database access application program 62 in step 419.

Figure 10:
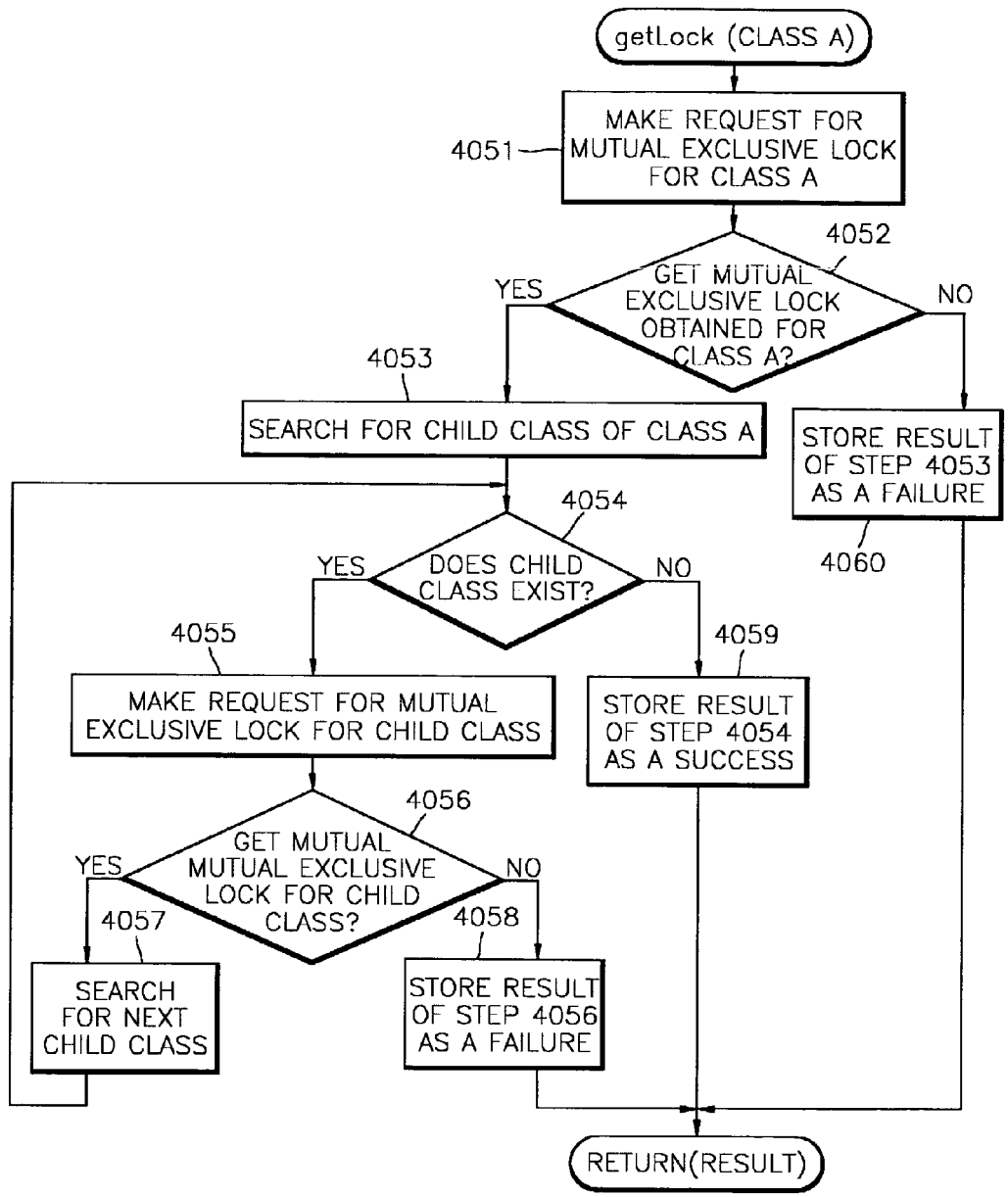
FIG. 10 is a detailed flowchart illustrating a getLock( ) function invoked in step 405 of FIG. 9.

FIG. 10 is a detailed flowchart illustrating a getLock( ) function invoked in step 405 of FIG. 9. The getLock( ) function requests a mutual exclusive lock for a respective class and uses a class to acquire the mutual exclusive lock for access the class without interference as an input parameter. In particular, FIG. 10 illustrates a case where the getLock( ) function includes a class A.

Referring to FIG. 10, the getLock( ) function makes a request for the mutual exclusive lock for the class A in step 4051 and then checks if the lock for the class A is acquired in step 4052. If the mutual exclusive lock for the class A is obtained, a search for any child classes of the class A is performed in step 4053. If there is(are) its child class(es) in step 4054, the mutual exclusive lock for a child class of the class A is also requested step 4055. If the mutual exclusive lock for the child class in step 4056 is obtained, the next child class is searched for in step 4057 and it returns back to step 4054.

If the mutual exclusive lock is not obtained for the class A in step 4052 or for any child classes in step 4056, this result is stored as a failure in step 4060 and 4058, respectively. Otherwise, when all of the class A, which is the input parameter, and its all child class(es) acquire the mutual exclusive lock, this is stored as a success in step 4059 and it returns back to the calling function.

Figure 11:
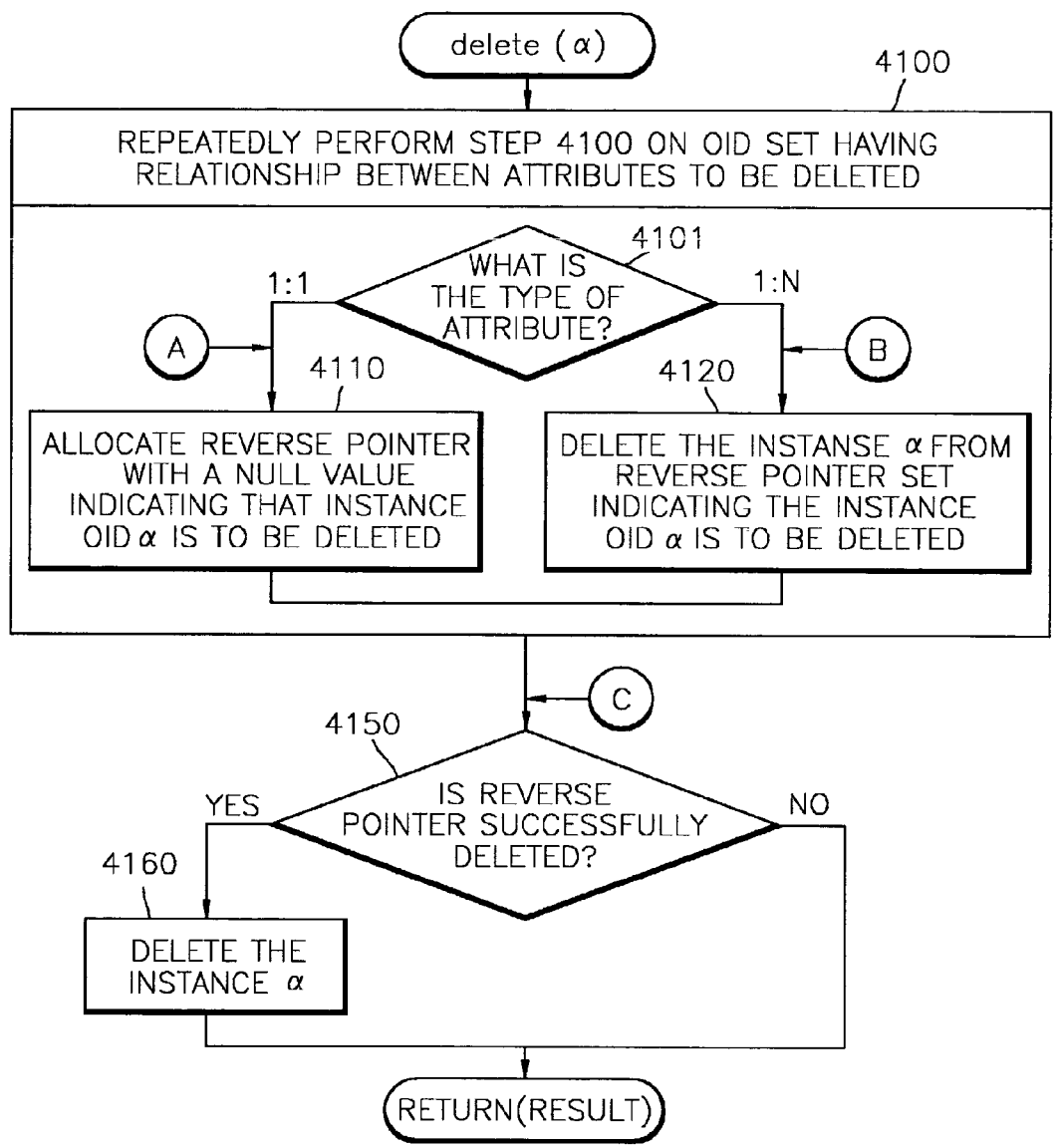
FIG. 11 is a detailed flowchart illustrating a delete( ) function invoked in step 410 of FIG. 9.

FIG. 11 is a detailed flowchart illustrating a delete( ) function invoked in step 410 of FIG. 9. The delete( ) function is a function that performs a deletion query instructed by a database access application program, i.e., substantially deleting target database. More specifically, FIG. 11 illustrates a case where the OID of a class interface to be deleted is a and the OIDs of instances of a class referred to by the instance OID α are β or β1, β2, . . . , βN.

Referring to FIG. 11, if the delete( ) function is invoked, it analyzes the type of attribute to be deleted and performs step 4100. OID sets, which define the relationship between attributes, are divided largely into 1:1 relationships and 1:N relationships. Step 4100 is performed on all attributes having the 1:1 or 1:N relationships of the instance as the input parameter of the function.

Referring to step 4100, the type of attribute is verified in step 4101. If the OID set has the 1:1 relationship, a reverse pointer indicating an OID α of a class interface to be deleted is set to a NULL value in step 4110, and if the OID set has the 1:N relationship, only an the instance OID α is deleted from the reverse pointer set in step 4120.

After the removal of the reverse pointer set in step 4120, whether the removal of the reverse pointer set is successfully performed is stored as the result. These steps will be described in detail with reference to FIGS. 12 and 13. The stored result is verified in step 4150. If the stored result indicates a failure in the removal, the stored result is referred to as an application program, whereas if the stored result indicates a success in the removal, finally, a class instance α is deleted and then the result is returned to the application program in step 4160.

Figure 12:
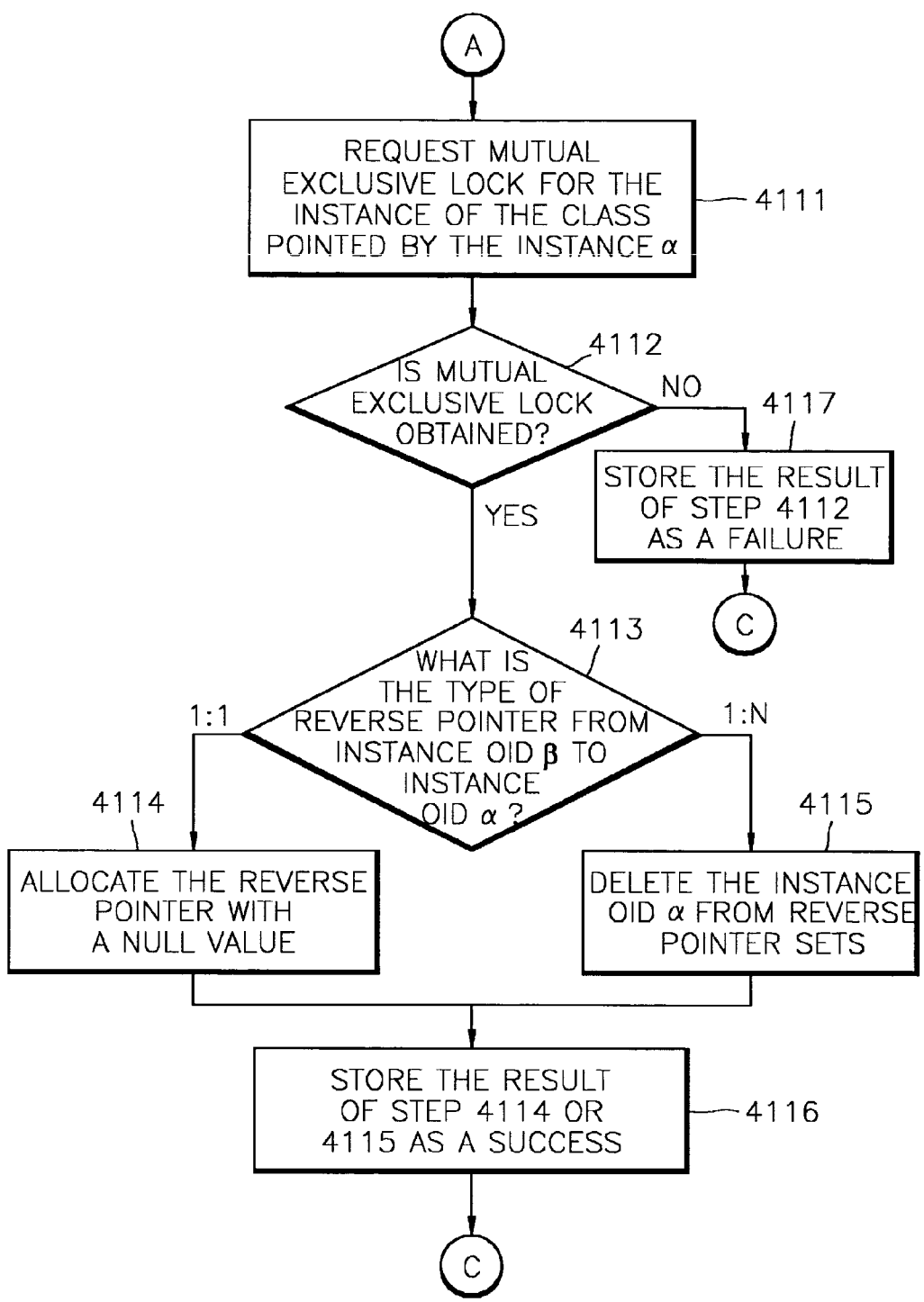
FIG. 12 is a flowchart illustrating a method for deleting an object identifier (OID) of 1:1 type relationships using the delete( ) function shown in FIG. 11.

FIG. 12 is a flowchart illustrating the operations of the delete( ) function in the case of deleting a 1:1 type OID, i.e., step 4110 of FIG. 11. More specifically, FIG. 12 illustrates a case where an OID of a class to be deleted is α, an OID of a class referred to by the instance OID α is β, and the type of attribute is a 1:1 type relationship.

In the case of a 1:1 type attribute, a mutual exclusive lock for the instance of the class pointed by the instance α as an input parameter of delete( ) function is requested for in step 4111 as shown in FIG. 12. Next, it is checked whether the mutual exclusive lock is obtained in step 4112. If the mutual exclusive lock is not obtained, this result is stored as a failure in step 4117. If the mutual exclusive lock is obtained, the type of reverse pointer, i.e., an instance OID type, from the instance OID β to the instance OID α is checked in step 4113. If the result of step 4113 reveals that the reverse pointer from the instance OID β to the instance OID α is a 1:1 type, the reverse pointer is given an OID for a NULL value in step 4114, and the result is stored as a success in step 4116. When the reverse pointer is a 1:N type, the instance OID α is deleted from the reverse pointer sets in step 4115, and it is stored as a success in step 4116.

Figure 13A:
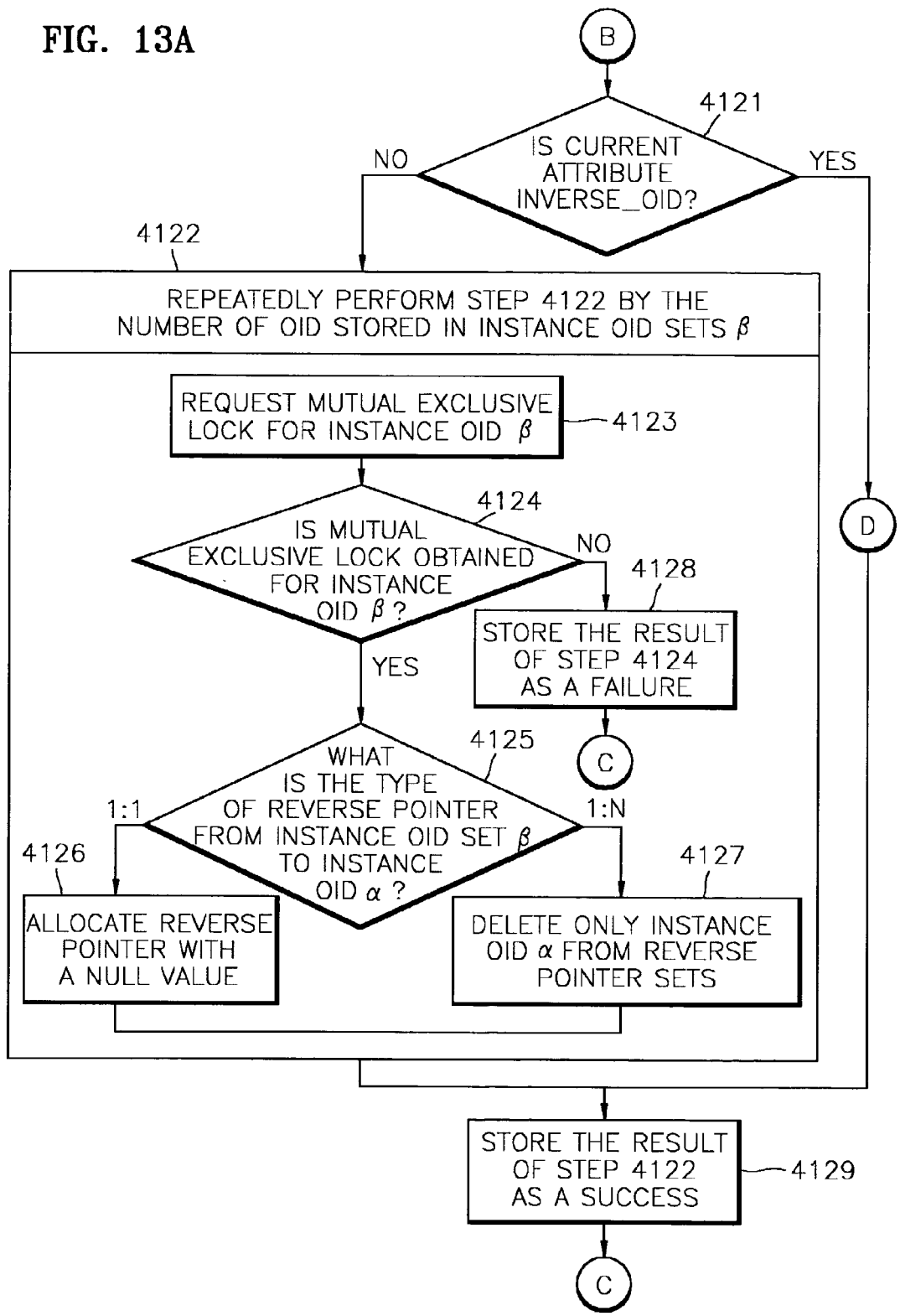
FIGS. 13A and 13B are flowcharts illustrating methods for deleting an OID set of 1:N type relationships using the delete( ) function shown in FIG. 11.
Figure 13B:
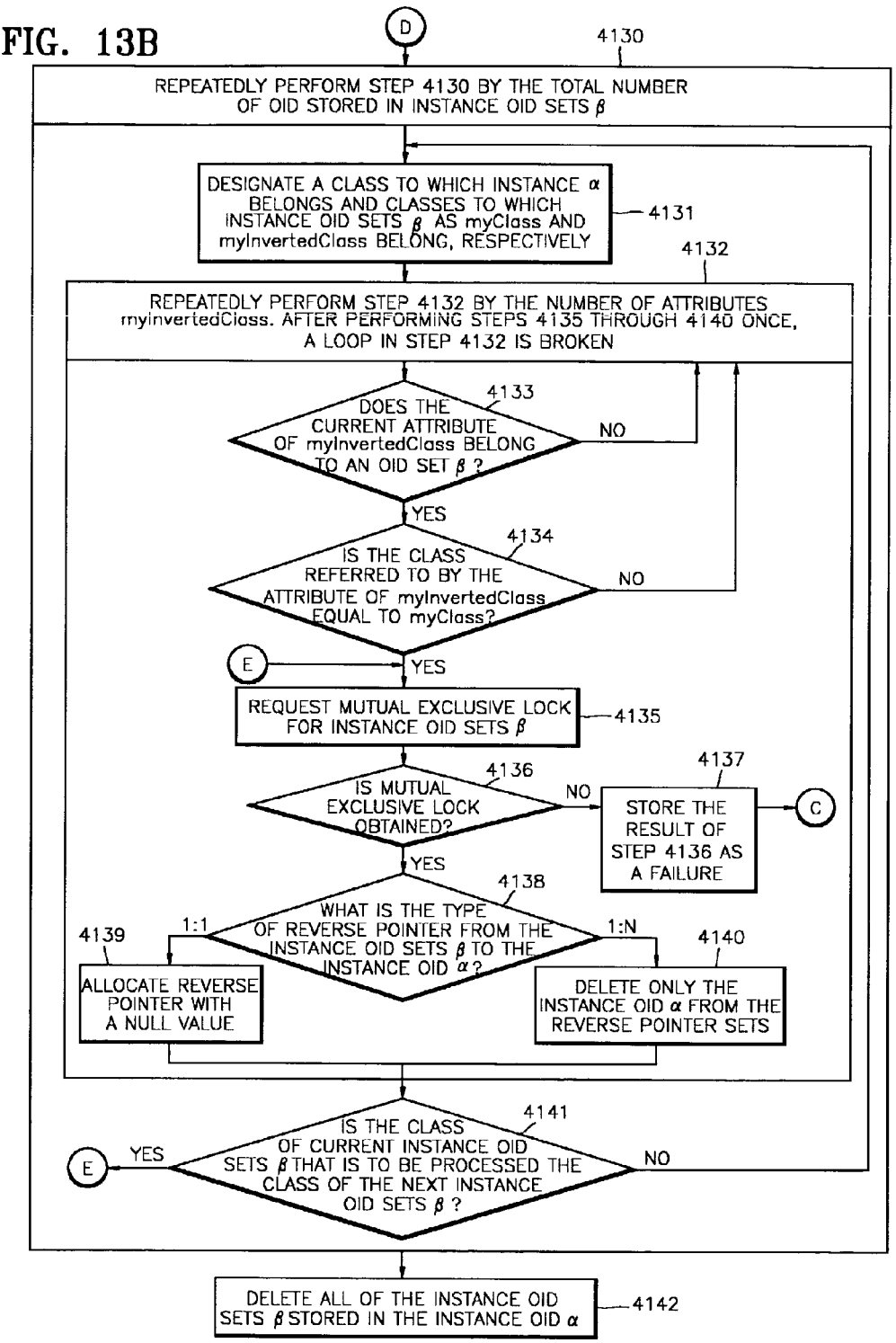

FIGS. 13A and 13B are flowcharts illustrating the operations of a delete( ) function in the case of deleting a 1:N type OID set shown in FIG. 11, respectively. Referring to FIG. 13A, if an OID set of the instances of a class referred to by an instance α of a class to be deleted is β, it is checked whether an attribute, which is being currently processed, is the second attribute INVEDRSE_OID of the attributes of a class to be deleted, in step 4121.

The attribute INVERSE_OID is one of the attributes supported by an ORDBMS according to the present invention and an attribute that is added into all instances for use in the ORDBMS although it is not defined by a user like the SELF_OID. The attribute INVERSE_OID includes pointers, i.e., OIDs, of instances of all classes that indicate its instance and is differentiated from other attributes in that it can include pointers from several related classes. Thus, the attribute INVERSE_OID must be processed differently from a general element of the OID sets. For this reason, it is verified in step 4121 whether an attribute that is currently being processed is an attribute INVERSE_OID or not.

If it is determined in step 4121 that the attribute that is currently being handled is not an attribute INVERSE_OID, i.e., it is an attribute of a general OID set, step 4122 is repeated by the total number of OID sets stored in the instance OID set(s) β.

In step 4122, a mutual exclusive lock for the instance OID set β is requested in step 4123, and it is checked in step 4124 if the mutual exclusive lock for the instance OID β is obtained. If it is determined in step 4124 that the mutual exclusive lock is not obtained, this result is stored as a failure in step 4128. If the mutual exclusive lock is obtained, the type of reverse pointer, i.e., OID instance, from the instance OID set β to the instance OID α is checked in step 4125. If the type of reverse pointer is a 1:1 type, a related pointer is set a NULL value in step 4126. If the type of reverse pointer is a 1:N type, only the instance OID α is deleted from the reverse pointer sets β in step 4127. After step 4122 is repeatedly performed by the total number of OIDs stored in the instance OID sets β, this result is stored as a success in step 4129.

If it is determined in step 4121 that the attribute that is currently being processed is an INVERSE_OID, step 4130 shown in FIG. 13B is performed on all of the OIDs belonging to the instance OID sets β.

Referring to FIG. 13B, step 4130 is repeatedly performed by the total number of OIDs stored in the instance OID sets β when the attribute that is currently being processed is INVERSE_OID.

In step 4130, the class to which the instance OID α to be deleted belongs, and the class to which the instance OID sets β belong are designated as myClass and myInvertedClass, respectively, in step 4131. The reason for naming the instance OID sets β myInvertedClass is because they include reverse pointers for several classes. It is difficult to know which attribute of the class myInvertedClass has a reverse pointer for the class myClass. Therefore, step 4132 is performed on all attributes of the class myInvertedClass. After the attribute having the reverse pointer for the class myClass is detected and steps 4135 through 4140 are performed only once on each attribute, a loop in step 4132 is discontinued.

In step 4132, it is checked whether the current attribute of myInvertedClass belongs to an OID set β in step 4133. If it is determined in step 4133 that this attribute does not belong to the OID set, a loop in step 4132 performed on the attribute is broken and step 4132 is performed on other attributes. If the current attribute of myInvertedClass belongs to the OID set, it is checked whether a class referred to by this attribute corresponds to the class myClass in step 4134. If the class is not the class myClass, a loop in step 4132 performed on another attribute is discontinued and step 4132 is performed on still other attributes.

If the class referred to by the current attribute of myInvertedClass is the class myClass, the current attribute of the instance OID sets βA, which are extracted from the attribute INVERSE_OID of the class myClass, refer to the class myClass. That is, the current attribute of the instance OID sets β include a pointer for the class myClass. Thus, a mutual exclusive lock for the instance OID sets β is requested in step 4135. Next, it is checked in step 4136 whether the mutual exclusive lock therefore is obtained. The checking result is stored as a failure in step 4137 when the mutual exclusive lock is not obtained; otherwise the type of reverse pointer, i.e., OID instance is checked for, from the instance OID sets β to the instance OID α in step 4138.

If it is determined in step 4138 that the type of reverse pointer is a 1:1 type, the reverse pointer is set a NULL value in step 4139. However, if the type of the reverse pointer is a 1:N type, only the instance OID α from the reverse pointer set is deleted in step 4140, and then, a loop performed in step 4132 is discontinued.

After step 4139 or 4140, it is checked in step 4141 if a class of a current instance OID sets β, which is to be processed, is the class of the previous instance OID sets β. If the result of step 4141 reveals that the class of the current instance sets OID β is the class of the next instance OID sets β, it is not required to perform steps 4131 through 4134 since these instance OID sets belong to the same class. Thus, step 4135 is performed to obtain the mutual exclusive lock for the current instance OID sets β, and an OID set α is deleted from a reverse pointer in steps 4135 through 4140.

When the class of the following instance OID set β is not that of the previous instance OID set β, i.e., the instances in the following and previous instance OID sets β belong to different classes, the loop of 4130 step is performed on the related instances. A case where the loop in step 4130 is discontinued because there is no instance OID set β means reverse pointers from the instance OID set β to the instance OID α have already been deleted. Accordingly, all of the instance OID sets β stored in the instance OID α are deleted in step 4142. If all steps illustrated in FIG. 13B are performed, the result is stored as a success in step 4129 and returned to the application program as shown in FIGS. 9 and 13A.

If a deletion query is input from the database access application program 62, instances of a class to be deleted, a child class(es) inheriting from a parent class, and the relationship with other classes related to the class are deleted.

Accordingly, a method of deleting class instances according to the present invention is remarkably differentiated from a conventional ORDBMS that only allows effective database management with reference to objects.

As described above, the present invention is described regarding a main-memory resident ORDBMS and a method of deleting class instances stored as OID sets using the ORDBMS. However, the present invention can be applied to other DBMSs that refer to a related class using a pointer.

Further, the present invention can be implemented as a computer readable code in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet. The computer readable recording medium can be dispersively installed in a computer system connected to a network and stored and accomplished as a computer readable code by a distributed computing environment.

While this invention has been particularly shown and described with reference to preferred embodiments thereof, it will be understood by those skilled in the art that various changes in form and details may be made therein without departing from the spirit and scope of the invention as defined by the appended claims.

As described above, according to a method of deleting a class instance according to the present invention, it is possible to delete all instances of a class to be deleted, instances of a child class(es) inheriting from the class, and instances of other classes, thereby maintaining consistency within database.

What is claimed is:

1. A method of deleting a class instance using an object-relational database management system (ORDBMS), the method comprising:
(a) when a query to delete a class instance is input from a database access application program, obtaining a first mutual exclusive lock for a class of the instance to be deleted and a second mutual exclusive lock for a child class of the class;
(b) checking a relationship between the class and the child class, wherein the relationship comprises a vertical relationship where at least one child class inherits from the class to be deleted and a horizontal relationship where the child class has a 1:1, or 1:N relationship to object identifiers stored in the class to be deleted;
(c) deleting a reverse pointer indicating the instance to be deleted if it is determined in step (b) that the relationship is a horizontal relationship of 1:1;
(d) deleting the instance from the reverse pointer indicating the instance if it is determined in step (b) that the relationship is a horizontal relationship of 1:N; and
(e) deleting the instance of the class after steps (c) and (d) are properly performed.

2. The method of claim 1, wherein step (a) comprises:
(a-1) requesting the first mutual exclusive lock for the class of the instance to be deleted; and
(a-2) obtaining the second mutual exclusive lock for the child class while searching for other child classes when the first mutual exclusive lock for the class of the instance to be deleted is obtained.

3. The method of claim 1, wherein the reverse pointer is included in the child class of the class to be deleted.

4. A method of deleting a class instance using an ORDBMS, the method comprising:
(a) checking a type of attribute, included in a class to be deleted, when a query of deleting an instance is input from a database access application program, wherein the type of attribute comprises a vertical relationship where at least one child class inherits from the class to be deleted and a horizontal relationship that a child class has a 1:1, or 1:N relationship to object identifiers stored in the class to be deleted;
(b) obtaining a first mutual exclusive lock for the class to be deleted and a second mutual exclusive lock for a child class of the class, and allocating a reverse pointer, which indicates an instance to be deleted, with a NULL value if it is determined in step (a) that the type of attribute is 1:1;
(c) deleting the instance from a reverse pointer set indicating the instance to be deleted if it is determined in step (a) that the type of the attribute is 1:N; and
(d) deleting the instance of the class to be deleted after steps (b) and (c) are successfully performed.

5. The method of claim 4, wherein if an object-identifier (OID) pointer of the class instance to be deleted is α and OID pointers of child class instances referred to by the pointer α are β, step (b) comprises:
(b-1) requesting a mutual exclusive lock for the class to be deleted and a child class of the class;
(b-2) checking the type of reverse pointer from the OID pointer α to the OID pointers β if the mutual exclusive lock is obtained for these classes;
(b-3) allocating the related reverse pointer with a NULL value if it is determined in step (b-2) that the type of reverse pointer is 1:1; and
(b-4) deleting the OID pointer α from a related pointer set if it is determined in step (b-2) that the type of reverse pointer is 1:N.

6. The method of claim 4 or 5, wherein if an object-identifier (OID) pointer of the class instance to be deleted is α and OID pointers of child class instances referred to by the pointer α are β, step (c) comprises:
(c-1) checking whether the OID pointer β includes reverse pointers of several classes;
(c-2) requesting the mutual exclusive lock for the OID pointer α and repeatedly performing steps (b-2) through (b-4) by the total number of the OID pointers β, when it is determined in step (c-1) that the OID pointers β include reverse pointers of a class; and (c-3) sorting out reverse pointers indicating the class instance to be deleted and deleting the OID pointer α from a related pointer set, when it is determined in step (c-1) that the OID pointers β include reverse pointers of several classes.

7. The method of claim 4, wherein step (a) further comprises:

(a-1) requesting the mutual exclusive lock for a related class when a query of deleting a class instance is input from the database access application program;

(a-2) searching for a child class of the class when the mutual exclusive lock is obtained for the class; and (a-3) obtaining the mutual exclusive lock for all the child classes searched for in step (a-2).

8. The method of claim 7, wherein the child class has a vertical relationship or a horizontal relationship with the class to be deleted, the vertical relationship refers to a case where the child class inherits from the class in the vertical direction and the horizontal relationship includes cases where the child class has a 1:1, 1:N, or M:N relationship to OIDs stored in the class to be deleted.

9. A computer-readable recording medium for recording a program that can execute a method of any one of claims 1 through 2 or 3 through 8 in a computer.

10. An object-relational database management system ("ORDBMS") comprising:

a database in which a relationship between classes is stored with object identifier ("OID") pointer set, wherein the relationship between classes comprises a vertical relationship where at least one child class inherits from a certain class and a horizontal relationship that the child class has a 1:1, 1:N, or M:N relationship to the OID; and an ORDBMS server for deleting an instance between classes of the database and OID pointers of other classes related to the instance when deleting the instance.

* * * * *